A. WEYMOUTH.
Car-Brake.
No. 213,153. Patented Mar. 11, 1879.
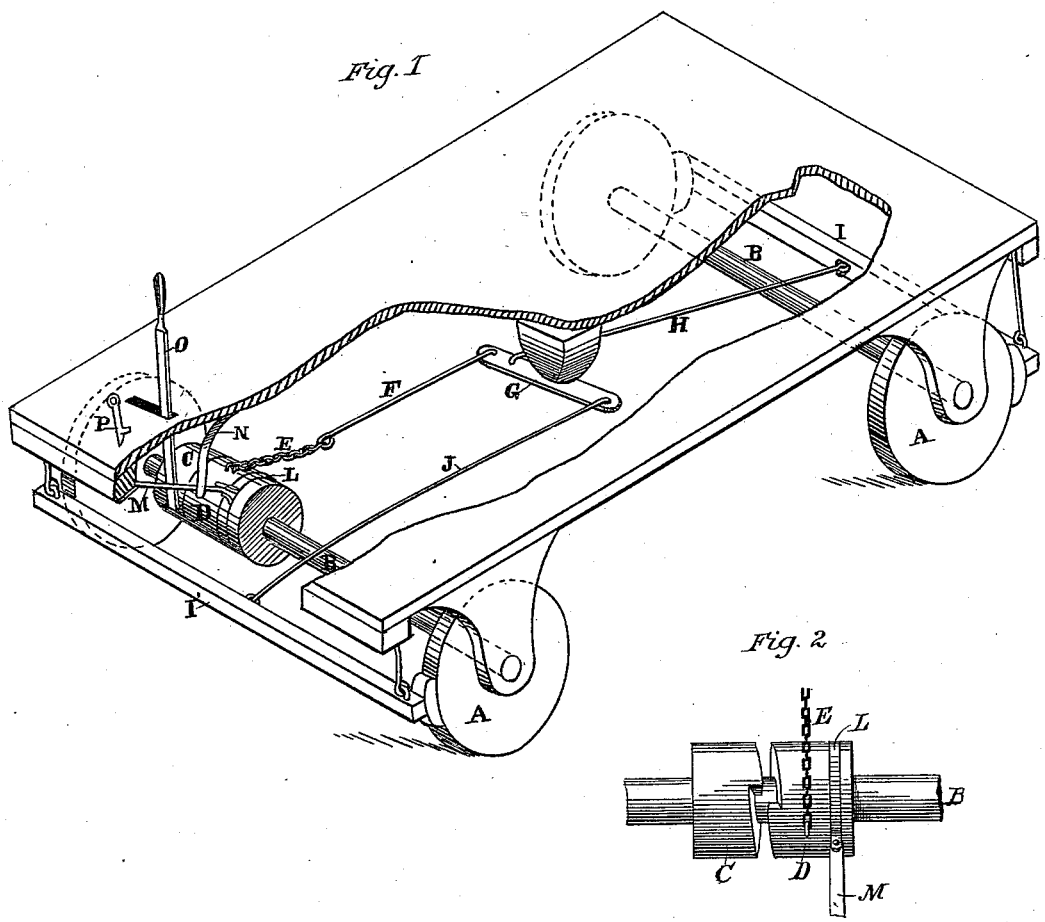
Witnesses
Geo. H. Strong
Frank A. Brook
Inventor
Albert Weymouth
by Dewey & Co.
Attys

UNITED STATES PATENT OFFICE.

ALBERT WEYMOUTH, OF LIVERMORE, CALIFORNIA.

IMPROVEMENT IN CAR-BRAKES.

Specification forming part of Letters Patent No. 213,153, dated March 11, 1879; application filed August 15, 1878.

*To all whom it may concern:*

Be it known that I, ALBERT WEYMOUTH, of Livermore, county of Alameda, and State of California, have invented an Improved Car-Brake; and I do hereby declare the following to be a full, clear, and exact description thereof, reference being had to the accompanying drawings.

My invention relates to an improved mechanism which is designed to be applied to the cabooses or cars which make up the rear ends of heavy trains; and it is of special value on those roads having steep gradients, when the rear end of the train sometimes becomes detached from the forward portion, in which case the rear cars run backward down the grades, thus causing serious accidents.

My invention is designed to remedy this defect; and consists in the attachment of an automatic brake apparatus which shall act in one direction while it allows the car to run freely in an opposite direction. A clutch is mounted on the axle of the car, and is so connected with the brake-bar as to act, when the car attempts to run backward, in throwing on the brakes, locking the wheels, and stopping the car.

Referring to the accompanying drawings, Figure 1 is a perspective view of my device. Fig. 2 is a detail view of the clutch.

Let A represent the wheel, and B the axles, of any ordinary car-truck. On the axle is placed a clutch of any desired form, the one I have shown in this instance being a common cam-shaped or ratchet clutch, the part C of which is keyed to the axle, and the part D being loose. Each of these parts has a gland or projection formed on it, as shown in Fig. 2, so arranged that when the axle is rotating forward the glands may pass by each other; but when the axle rotates back they will engage with each other. On the part D of the clutch, in which the axle revolves freely, is attached a chain, E, to which is fastened a bar, F, the other end of said bar being connected with the long arm of the horizontal lever G, said lever being properly pivoted to the truck-frame or bottom of car, as shown. Midway between the end of the long arm of the lever and the fulcrum-pin is attached the draw-bar H, the other end of which is secured to the center of the brake-bar I of the set of wheels on the opposite end of the truck from that on which the clutch is mounted. To the short arm of the lever is attached the draw-bar J, the other end of which is secured to the brake-bar I', as shown.

Around the free part D of the clutch passes the sleeve or strap L, to which is pivoted a rod or lever, M, the other end of which is pivoted on the truck frame or bed. Attached to the frame or bed is the curved spring N, which presses against the rod M, fastened to the collar or strap L, the spring thus keeping the part D pressed against the part C of the clutch.

Through the platform or bottom of the car projects the lever O, the lower end of which impinges against the rod M, so that the part D may be pressed back, so as not to allow the glands on the clutch to engage when it is not desired to use said clutch, as in the case of backing the cars. A catch, P, serves to hold the lever O in the desired position.

This device is more particularly intended for use on cabooses or such other cars as may be usually connected at the rear end of a train, so that in case part of the cars become uncoupled, as soon as backward motion is commenced the cars are immediately stopped at the first rearward revolution of the wheels, and before any impetus is gained. Being attached to the rear axles, in the manner described, as soon as any retrograde movement of the cars occurs the clutches come into gear; and as the spring keeps the loose part close against the part C, said part C is revolved back with the part D. The chain attached to the part C is then drawn back, which operates the lever and draw-bars, as herein described, thus putting on the brakes tightly and stopping the train. When the device is used on both ends of the car the forward one is thrown out of gear by the hand-lever while the train is running ahead, and if it is desired to back the train the rear one may also be thrown out of gear.

This arrangement need in no manner interfere with the present method of using brakes, as it is intended as a safety device for preventing cars running backward in case part of the train becomes uncoupled in going up a grade, where such accidents usually occur.

In case of an emergency, when it is necessary to stop the cars suddenly, by releasing the lever on the front end of the car supplied with this device, the clutch will automatically throw the brakes on firmly, so as to stop the revolution of the wheels.

Having thus described my invention, what I claim as new, and desire to secure by Letters Patent, is—

The automatically-operating brake device consisting of the clutch C D, with its connecting chain or link E, in combination with the brakes and their connecting rods and levers, substantially as and for the purpose herein described.

In witness whereof I hereunto set my hand.

ALBERT WEYMOUTH.

Witnesses:
JAMES BEAZELL,
THEO. GORNER.